Feb. 24, 1931. D. S. JACOBUS 1,793,620
DUST COLLECTING SYSTEM AND METHOD OF OPERATING THE SAME
Original Filed Aug. 17, 1916 6 Sheets-Sheet 1
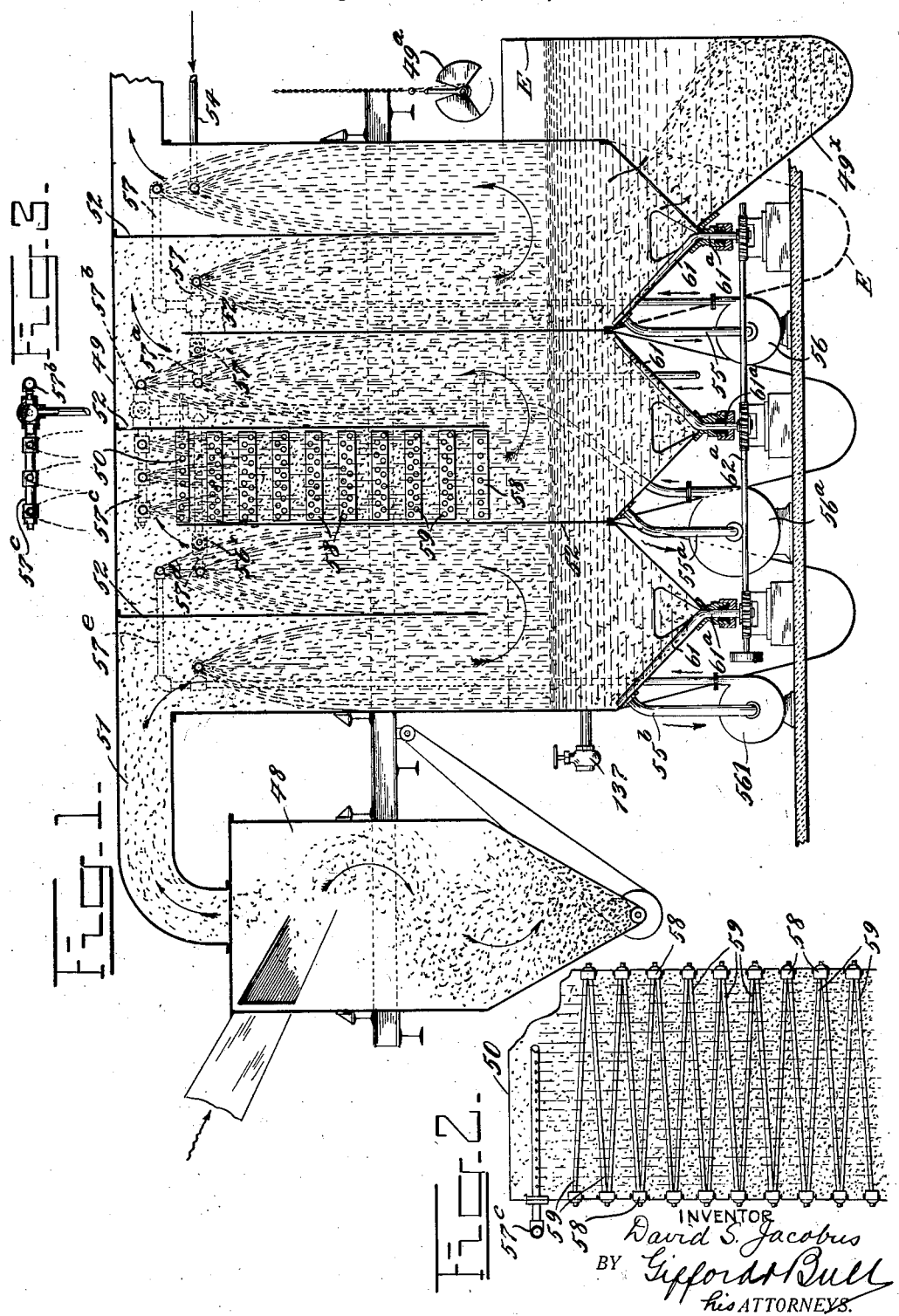
INVENTOR
David S. Jacobus
BY Gifford & Bull
his ATTORNEYS.

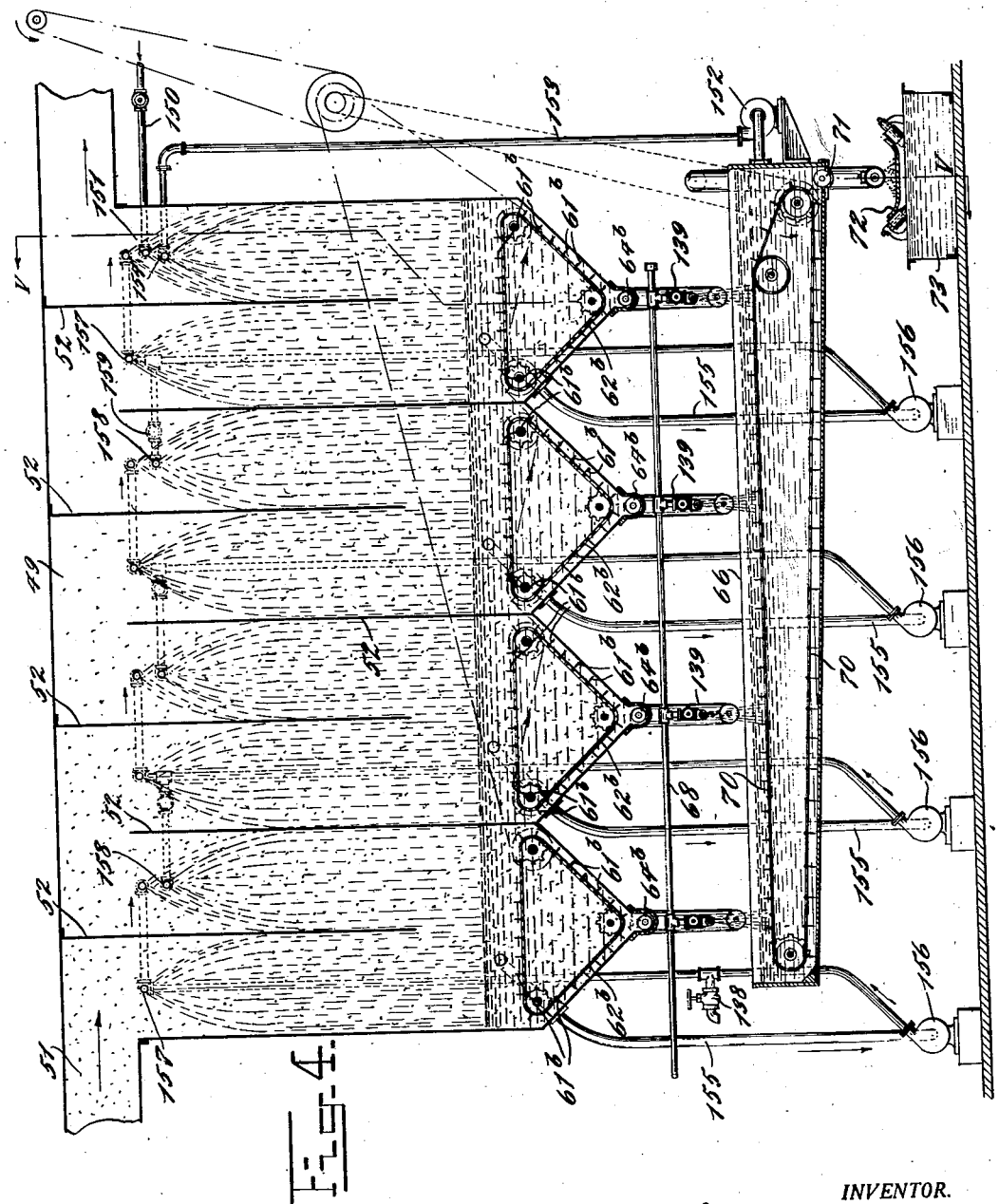

Feb. 24, 1931.　　　　D. S. JACOBUS　　　　1,793,620
DUST COLLECTING SYSTEM AND METHOD OF OPERATING THE SAME
Original Filed Aug. 17, 1916　　6 Sheets-Sheet 3
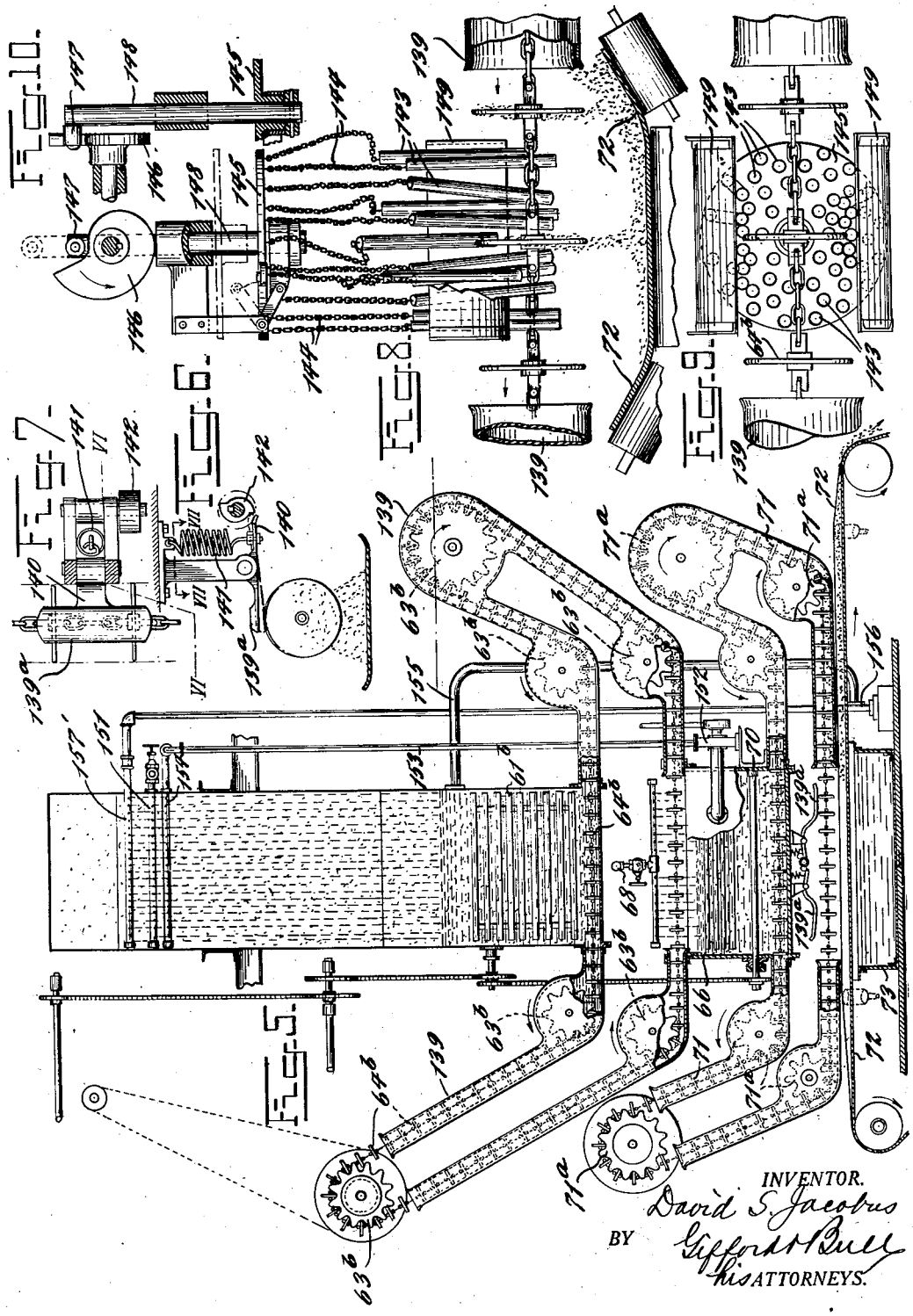
INVENTOR.
David S. Jacobus
BY
his ATTORNEYS.

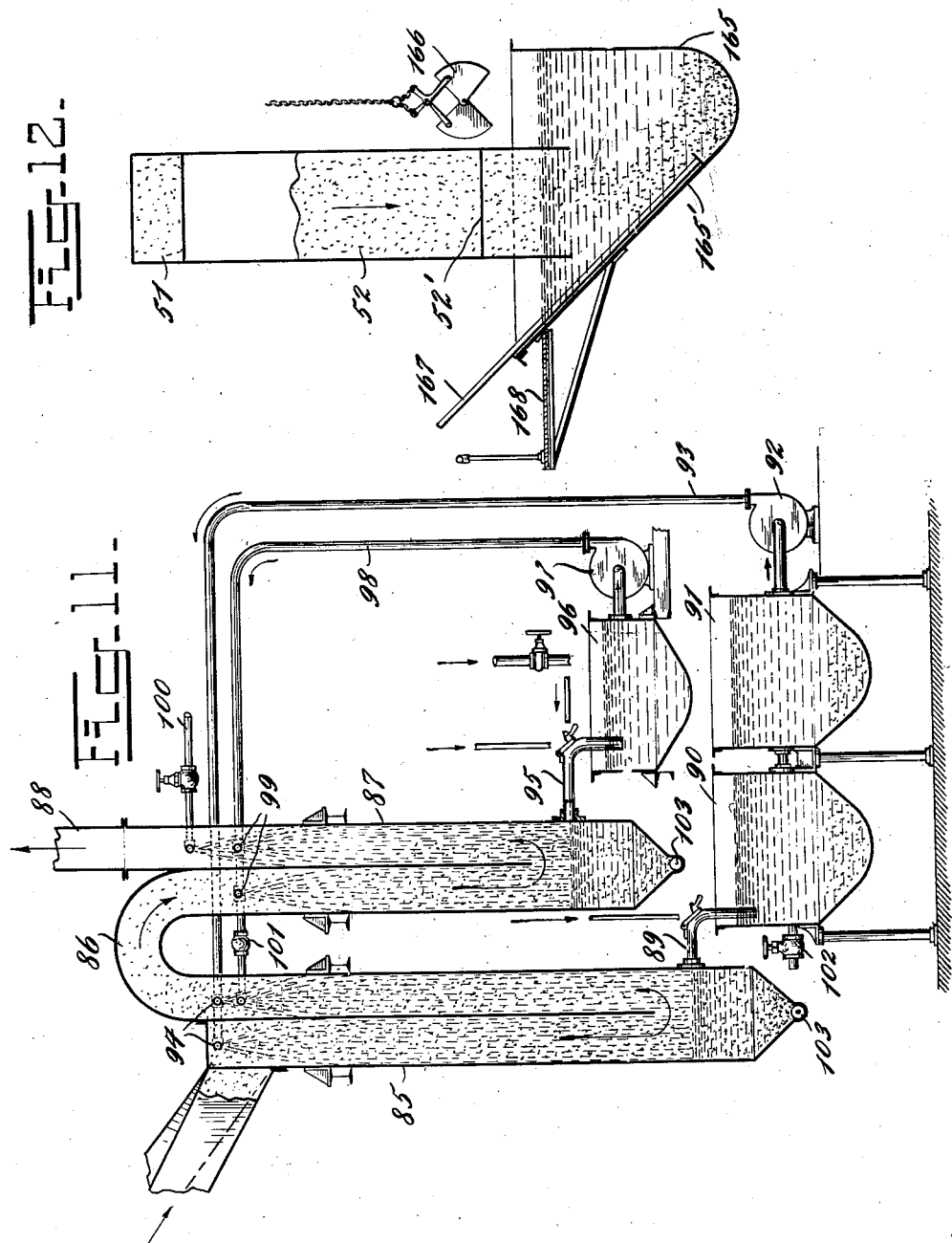

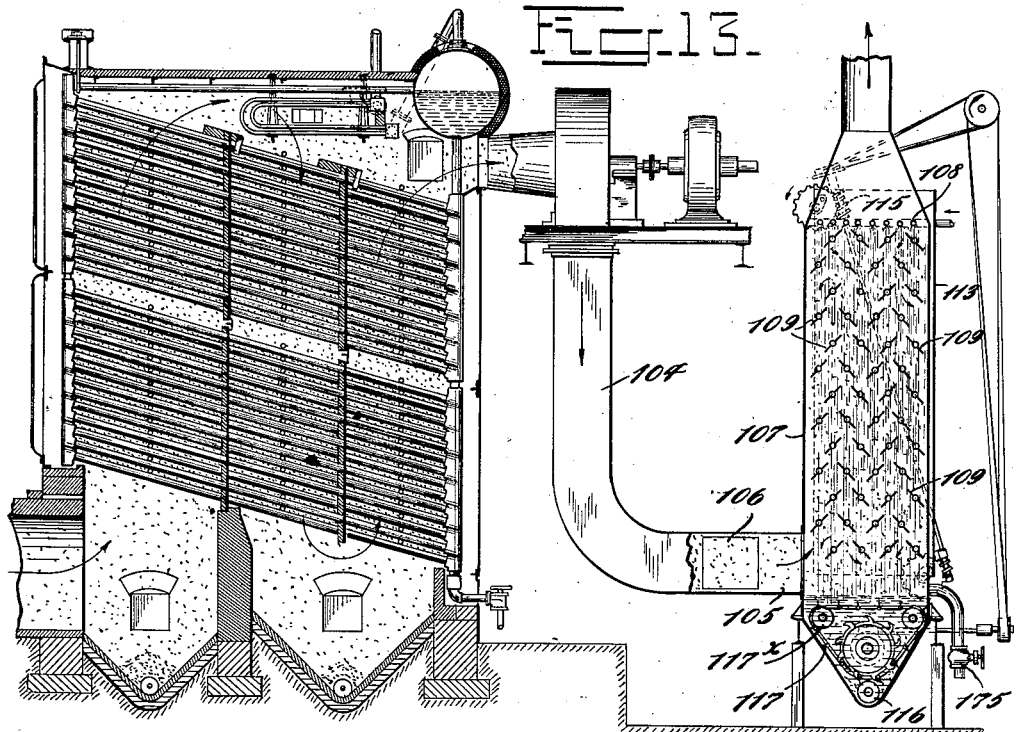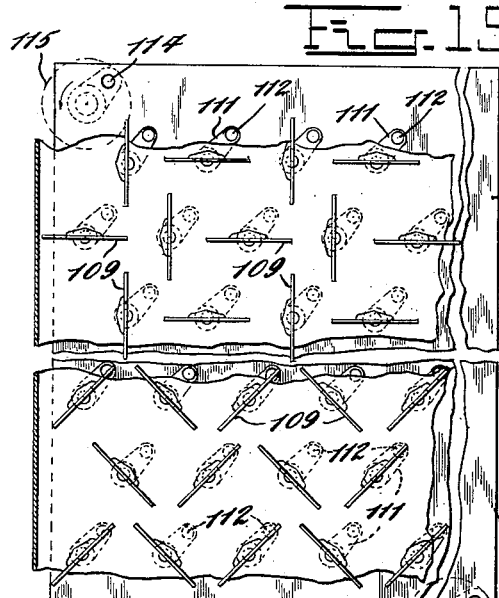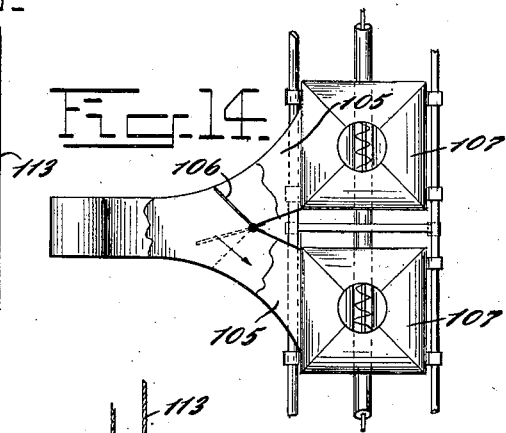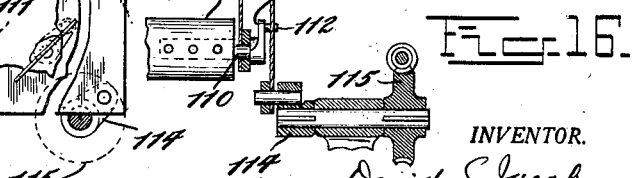

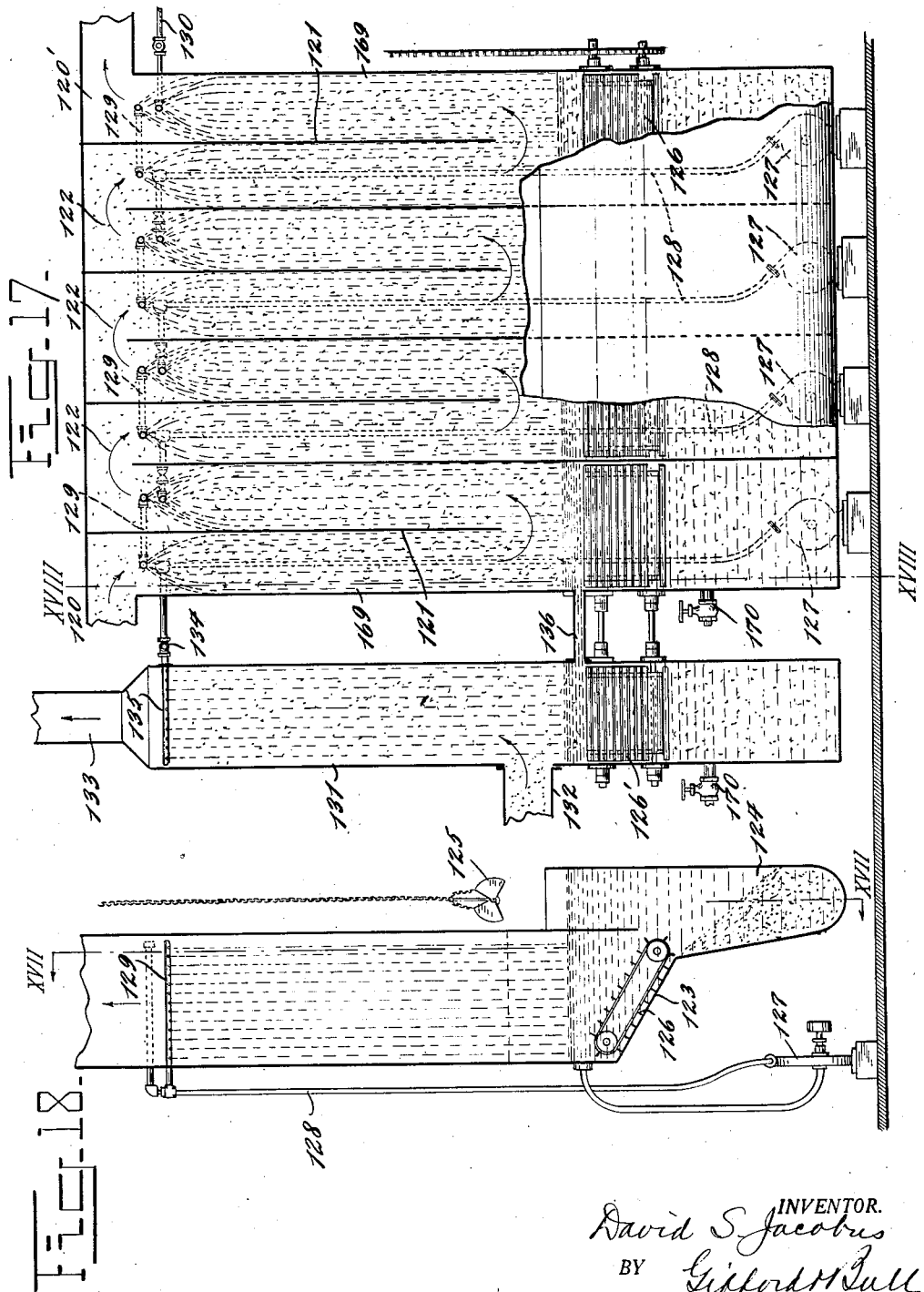

Patented Feb. 24, 1931

1,793,620

UNITED STATES PATENT OFFICE

DAVID S. JACOBUS, OF JERSEY CITY, NEW JERSEY, ASSIGNOR TO THE BABCOCK & WILCOX COMPANY, OF BAYONNE, NEW JERSEY, A CORPORATION OF NEW JERSEY

DUST-COLLECTING SYSTEM AND METHOD OF OPERATING THE SAME

Original application filed August 17, 1916, Serial No. 115,507. Divided and this application filed May 27, 1920, Serial No. 384,531. Renewed August 10, 1928.

Figure 1 is a longitudinal, vertical section of a dry dust catcher and series washer and economizer, which illustrates certain features of my present invention, and which may be employed with any apparatus producing a volume of hot dust-laden gases the heat of which gases it is desirable to economize; Fig. 2 is a sectional, side elevation of the economizer of Figure 1, showing the pipe arrangement; Fig. 3 is a detail view of one of the spray pipes for the economizers of Figs. 1 and 2; Fig. 4 is a longitudinal section showing a modified form of series washer for dust-laden gases; Fig. 5 is a vertical section taken along the lines V—V of Fig. 4; Fig. 6 is a detail view of one of the shakers taken along the line VI—VI of Fig. 7; Fig. 7 is a plan view of the shaker taken partially along the line VII—VII of Figure 6; Fig. 8 is an elevation of a modified form of shaker; Fig. 9 is a plan view of the modified form of shaker shown in Fig. 8; Fig. 10 is a detail view, partly in section, of a part of the modified form of shaker of Figs. 8 and 9; Fig. 11 is a detail view of a double washer system which may be used instead of the single washer system shown in the preceding figures; Fig. 12 is a detail view of a modification of Fig. 1; Fig. 13 is a sectional side elevation showing a modified form of washers for the gases from a waste heat boiler; Fig. 14 is a top plan view, partly broken away, of the washers of Fig. 13 showing the valve arrangement for switching from one washer to the other; Fig. 15 is a detail view showing the connections for operating the rotating shelf pieces of Fig. 13; Fig. 16 is a detail view of one of the driving connections for giving orbital motion to a driving plate for rotating the shelf pieces of Fig. 13; Fig. 17 is a sectional side elevation partly on the broken line XVII—XVII of Fig. 18; Fig. 18 illustrating a modification of my invention is a vertical section on the line XVIII—XVIII of Fig. 17.

My invention relates to apparatus for the removal and handling of dust, particularly such as is derived from cement kilns. The object of the invention is to provide an apparatus for removing and recovering the dust which, in addition to receiving the dust which is a valuable part of the material fed to the kilns, will avoid the nuisance of the settlement of dust on the surrounding grounds and buildings. Certain features of my invention enable the recovery of valuable products from the gases, as I have found that by suitably treating the dust-laden gases certain valuable portions may be separated out and recovered separately from the dust proper, or, at least, may be so concentrated in a given mixture as to make the recovery of these valuable portions commercially practicable.

More particularly, my present application, which is a division of my patent No. 1,463,363 which issued on or about July 31, 1923 for cement kiln systems, is directed to the apparatus disclosed in said prior application in which the dust is removed by contact between the gases and a liquid, and it is one of the objects of my present invention to wash such gases so as to remove the dust therefrom, and at the same time to provide apparatus by which the dust thus washed from the gases may be readily handled, and so that the wash water may be utilized to the best advantage, both as to the quantity of water to be used, as well as the quality of the material to be recovered. Another object of my present invention is to provide a means by which the heat of the dust-laden gases may be recovered and utilized. My present invention also relates to certain combinations and arrangements of parts hereinafter described, the advantages of which will be apparent to those skilled in the art from the following description:

In Figure 1 I show a dust-separating apparatus which may be employed to separate the dust from any dust-laden gases, and particularly such gases coming from cement kilns, which are not only dust-laden but are also heated. In this figure I show a combined dry separator 48, a washing system 49, and a feed water heater, or economizer, 50, for the gases coming from the internal apparatus, such as a cement kiln, and which may have passed over a waste heat boiler before entering the dry separator. In the form illustrated, the flue 51 from the top of the dry separator 48 enters the top of one member of the washing system. The washer consists of a large chamber divided by partitions 52 into a series of chambers communicating with each other alternately at the top and bottom so that the gases flow in an upward and downward course therethrough. In the last pass of this flue, the gases are acted upon by a fresh water spray from spray pipe 54 which projects into the upper part of the right hand compartment of the last chamber. The water collecting in the lower part of this last chamber is drawn out through pipe 55 to a circulating pump 56 which lifts it to the spray pipes 57 and 57$^a$.

The pump 56 and spray pipe 57 recirculate the water through the last chamber while the spray pipe 57$^a$ sprays a portion of the water into the middle chamber, the amount being regulated by means of a valve 57'. The water dropping in the middle chamber passes out through the pipe 55$^a$ to circulating pump 56$^a$, which lifts it through the pipe 561 to the spray pipes 57$^b$ and 57$^c$, both spraying in the central chamber; the pipe 561 also leads water to the pipes 57$^d$, which spray water in the right hand compartment of the first chamber, the amount being regulated by means of a valve 56'. The spray pipes 57$^c$ spray water over the feed water heater shown at 50. From the first chamber the water descends through the pipe 55$^b$ to pump 56$^b$ which lifts it to the spray pipes 57$^e$, which spray water in both compartments of the first chamber. In this way the water is recirculated through both compartments of each chamber, and a portion of the water from each chamber, except the first, passes back to the chamber in advance of it, so that the concentration of the water in each of the chambers becomes successively greater from the last toward the first chamber. The concentrated water may be drawn off from the first chamber through the tap or valve 137.

In one of the left hand compartments of the center chamber I locate the heater or economizer 50, shown in detail in Figure 2, and comprising opposite headers 58 connected by inclined horizontal pipes 59 (Fig. 2). It will be understood that this feed water heater or economizer may be connected with any suitable boiler used in operating the plant. The circulating pump 56$^a$ is preferably larger than the others and lifts the water to the series of special spray pipes 57$^c$ which spray the water over the feed water heater tubes, thus giving a greater flow of water to prevent the material building up on the tubes of the feed water heater.

Dust having certain characteristics, and particularly such as comes from cement kilns, will become attached to tubes or pipes where there is a limited amount of moisture or water, but by providing excess of water, the tendency of the dust to attach to the tubes is greatly lessened. The feed water heater or economizer is so built that the tubes are readily accessible. The feed water preferably enters at the bottom and is taken out at the top.

In the bottom hopper of each of the double chambers of the washer I employ scraping blades 61 on hubs 61$^a$, each journalled in the bottom of a hopper and carrying exteriorly thereof a worm wheel meshing with a worm on shaft 62$^a$ driven by any suitable connections. A wall of each hopper is extended and downwardly inclined to form the bottom wall 49$^x$ of the open top trough-like structure E, so that the mud passing from the hopper and lodging in the trough, may be removed by a grab bucket 49$^a$, or by other means, such as a screw or drag conveyor. In Figure 1, the normal position of structure E is shown in full lines for the first and middle chambers, and in dotted lines for the last chamber. The structure shown in full lines for the last chamber is designedly turned out of position for purpose of illustration.

In Figures 4 to 7 is illustrated another form of washing system for the gases coming from the source of the heated dust-laden gases, the feed water heater or economizer being omitted. In the form here shown, the fresh water is fed through pipe 150 to spray 151 in the right hand compartment of the last chamber. In this way the coldest water is sprayed into the coldest gases, and the fresh water is sprayed into the cleanest gases, as in Figure 1.

In addition to the water sprayed through the pipe 150, I also introduce water into the right hand compartment of the last chamber from tank 66 through pump 152, pipe 153 and spray 154. The water from the bottom of the last chamber passes downward through pipe 155 to pump 156, and is raised by the latter to sprays 157 in both compartments of the last chamber and also to spray 158 in the right hand compartment of the third chamber. The amount of water passing through spray 158 is regulated by a valve 159 through means exterior to the casing. The water is recirculated through the other compartments and chambers in the same general way by the pipes, pumps and sprays shown in the drawings. The concentrated water is drawn off from the first chamber through the tap or valve 138.

In connection with this washing system is shown a system for collecting the dust washed from the gases. In this system the scraper blades 61$^b$ are connected to chains 62$^b$, which are run continuously in the same direction. The material in the form of mud is removed from the bottoms of the spray chambers by means of conveyors 64$^b$ shown in Figure 5. The tube 139, in which the conveyor runs, extends exteriorly to a level above the water line in the spray chambers, so that the water is not taken from the spray chambers by the action of the conveyor. The conveyors are run by sprocket wheels 63$^b$ in the direction indicated by the arrows. The material taken by the conveyors 64$^b$ is delivered to the tank 66. The conveyor blades as they pass above the tank are washed by means of spray supplied from a water pipe 68, the water and washed off material falling into the tank 66. The material collecting in the bottom tank is carried along its inclined bottom by the chain and scraper system 70, and is delivered to a second conveyor 71. The conveyor 71, like the conveyor 64$^b$ consists of a chain carrying a number of conveyor blades and driven in the direction indicated by the arrows by sprockets 71$^a$. The conveyor 71 delivers the material taken from the bottom of the tank 66 on to a belt conveyor 72, traveling on an inclined pulley system over a tank 73. Shakers or strikers 139$^a$ are arranged to dislodge the material from the conveyor 71 and cause it to fall on the belt 72. One of the strikers 139$^a$ is shown in detail in Figures 6 and 7, and consists of a tapper arm 140 actuated by means of a spring 141 and cam wheel 142 to strike the blades of the conveyors and knock off the wet material adhering to them.

In Figures 8, 9 and 10 is illustrated a modified form of knocker for clearing the conveyor blades of the wet material. This form of knocker consists of a number of rods 143 hung by means of chains 144 from a circular plate 145. The plate is raised and suddenly allowed to drop by means of a cam wheel 146 engaging a roller 147 carried by the plate-supporting shaft 148. The rods 143 fall against the conveyor blades and chain and dislodge the material therefrom. The shaft 148 is given a slow, rotary movement. The guards 149 are provided to direct the material to the middle of the blade conveyor 72, and to direct the lower ends of the rods against the conveyor blades and chain. The guards 149 also cause the rods to strike against each other and keep them clear of the muddy material.

In Figure 11, I show a double washer system for the dust-laden gases. From the outlet of the first washer 85, the gases flow through the outlet 86 down into the second washer 87, and finally escape therefrom to the atmosphere at 88. The water which overflows from the first washer flows through pipe 89 into the tank 90, from which it flows to a second tank 91, from which is it pumped by the centrifugal pump 92 through the pipe 93 to the first washer sprays 94. Similarly, the overflow water from the second washer 87 flows through pipe 95, into tank 96, from which it is taken by centrifugal pump 97, and forced through pipe 98 to the sprays 99, for the second washer. Fresh water for the system is supplied through pipe 100 from any suitable source. A supply of water for the first washer may be taken from tank 96 either separately by pipes or by valved extension 101 of the pipe 98. With the series washer shown, the freshest and cleanest water is made to act on the gases after they have been partially washed, and by properly regulating the amount of water which enters the first washer, the water in the tanks 90 and 91 may be made to reach any desired degree of concentration. In this way, the heat in the waste gases may be used to concentrate the wash water, with a view of recovering certain elements, such as potash, in the wash water which can be drawn off through a connection, such as shown at 102. Furthermore, by employing a series washer, the elements are more cleanly washed out of the gases than by an ordinary washer, as the gases leaving the water are brought into contact with the freshest water. The mud and slime which may accumulate in the two washers shown, may be removed by conveyors or suitable devices 103.

In Figure 12, I show an end view of the modification of the washer shown in Figure 1. The inlet 51 conducts the gases into the washer from which point they pass downward and under the partition 52 (the lower edge of the latter being indicated at 52'), and then pass upward at the rear of the partition 52. The lower part of the chamber enters a tank or trough 165, formed with an inclined wall 165' and curved bottom, the tank being maintained substantially full of water by any suitable means. The precipitated solids may be removed from the bottom of the tank by means of a grab bucket 166, or by a screw or drag conveyor. A scraper or hoe 167 may be employed by an operator standing on the platform 168, to push the mud downward along the inclined wall of the tank within reach of the grab bucket, or of the conveyor.

In Figures 13 to 16, I show the gases coming from the exhaust fan of a waste heat boiler as being fed into a pipe 104, having two branches 105, controlled by a valve or damper 106, by means of which the gases may be passed through either one or both of two washers. Each flue 105 enters the lower part of one of the two washers 107, each having a water spray system 108. Within these washers are arranged horizontal rows of shelf pieces 109, on which the gas and water will impinge, and which will lead to a more thorough intermingling of the water with the gases and more complete removal of the dust and other foreign elements. These shelf pieces are preferably made to turn or rotate, being carried on end shafts 110, extending through the sides of the washer and having at one end a crank arm 111. Pins 112 on the crank arm 111 enter a plate 113, which is given an orbital motion by cranks 114, through the slow motion gearing 115, shown in Figure 16.

Each of these washers is preferably provided with a separate pump and separate tank for the wash water. In operating the washers, the water is first circulated in one of the washers until it absorbs a certain percentage of potash, etc., and reaches a certain degree of concentration. The supply of make-up water to the washer is then shut off and a circulation is maintained until a further degree of concentration is secured. While the highest concentration is being carried on in one washer, the other washer will be run at a comparatively low concentration, and the greater portion of the gases will be directed through the washer which is running at low concentration by adjusting the damper 106. The greater part of the mud thrown down from the gases will be removed by the conveyor 116, to which the material is fed by scrapers 117, passing over the sprocket wheels 117ˣ and acting on the sides of the hopper-shaped bottom portion. After the solution in one of the washers reaches the desired strength or concentration, it is drawn off through valve 175.

In Figures 17 and 18, I show the gases as being delivered through flue 120 into the first of the series of spray chambers 169, each chamber being provided at its top with a division plate 121 dividing it into two compartments and communicating with the succeeding chamber through an opening 122, so that the gases may be circulated in a downward and upward path through the compartments of the successive chambers until they are finally permitted to pass into the air through the outlet flue 120'. Each spray chamber is formed with an inclined bottom wall 123 communicating with an open-top tank 124 from which the precipitated solids may be removed by means of a grab bucket 125 or by a screw or drag conveyor. A scraper 126 may be employed to scrape down mud from the inclined bottom wall 123. Each of the spray chambers is provided with a separate pump 127 communicating with a pipe 128, by means of which the water at the bottom of the chamber is raised to a spray 129, the arrangement being in general the same as in Figure 1. Thus, the water is circulated until it absorbs a large percentage of potash, etc., and is conveyed to the evaporating tank which is a tower-like structure 131, formed with an air inlet 132 through which air is forced from a blower or suitable apparatus, and passes upwardly through the tower and out through the flue 133. The water from the spray pipe 129 for the first chamber is by-passed through valve 134 and enters the evaporating tank 131 in the form of a spray from spray 135, and is evaporated in part by the flow of air through said evaporating tank. The unevaporated water is returned to the first spray chamber 169 through the pipe 136. The bottom of the tank 131 may be formed similarly to the corresponding portions of the spray chambers, and its inclined bottom wall may be provided with a scraper 126' through connections with the scrapers 126 in the spray chambers. The concentrated solution may be drawn off from the evaporating tank 131 and spray chamber 169 through suitable valves or taps 170.

Instead of returning the unevaporated water from the evaporating tank 131 to the first spray chamber 169, it may be retained in the evaporating tank 131 and recirculated through the latter by means of a separate pump.

In the several washers shown, I propose to remove the potash and other foreign elements from the concentrated solution, and concentration of the solution is aided by means of the heat in the flue gases. Moreover, the air admitted into the evaporating tank, above described, may be preheated by the hot flue gases.

While different forms of apparatus have been illustrated, it is to be understood that the invention is not limited to the described details, but that the apparatus may be varied within the scope of the following claims.

I claim:—

1. Apparatus for treating dust-laden gases, means for introducing dust-laden gases to said apparatus, a plurality of washers through which the dust-laden gases are passed successively, each washer being provided with a tank at the bottom and a spray system at the top, means for supplying wash water to said apparatus, a pump for each washer to force wash water from the tank to the spray system and a by-pass between the circulating system in each pair of tanks, whereby a regulated amount of water may be diverted from the circulating system of one washer and at the same concentration as the liquid in said washer into the adjacent washer.

2. Apparatus for treating dust-laden gases, comprising a plurality of washers through which the gases are passed successively, each washer being provided with a tank at the bottom and a spray system at the top, a pump for each washer to force wash water from the tank to the spray system of the associated washer, and a connection for forcing liquid from the pump associated with a given washer to the spray of an adjacent washer and at the same concentration as the water in said washer.

3. Apparatus for treating dust-laden gases, comprising a plurality of washers through which the gases are passed successively, each washer being provided with a tank at the bottom and a spray system at the top, means for passing gases through said washers in series, a pump for each washer to force liquid to the spray system of the associated washer, and a connection for forcing fluid from a pump associated with a given washer to the spray of another washer in the direction of the incoming gases.

4. Apparatus for treating dust-laden gases, comprising a plurality of washers through which the gases are passed successively, each washer being provided with a tank at the bottom and a spray system at the top, means for passing gases through said washers in series, a pump for each washer to force liquid to the spray system of the associated washer, and a connection for forcing fluid from a pump associated with a given washer to the spray of the adjacent washer in the direction of the incoming gases.

5. Apparatus for removing from gases a material soluble in a liquid, comprising a plurality of washers through which the gases are passed successively, each washer being provided with a tank at the bottom and a spray at the top, and pumps each associated with a given tank for forcing liquid through the spray of the associated tank and connections whereby liquid may be forced from a given tank to the respective spray system of another washer, liquid being forced forwardly from washer to washer in one direction only whereby the solution of soluble material in the liquid is concentrated as it flows from washer to washer.

6. Apparatus for removing from gases a material soluble in a liquid, comprising a plurality of washers through which the gases are passed successively, each washer being provided with a tank at the bottom and a spray at the top, and pumps each associated with a given tank for forcing liquid through the spray of the associated tank and connections whereby liquid may be forced from a given tank to the respective spray system of another washer in the direction of the incoming gases, liquid being forced forwardly from washer to washer in one direction only, whereby the solution of soluble material in the liquid is concentrated as it flows from washer to washer.

DAVID S. JACOBUS.